(12) United States Patent
Akers et al.

(10) Patent No.: US 9,018,586 B2
(45) Date of Patent: Apr. 28, 2015

(54) APPARATUSES FOR LARGE AREA RADIATION DETECTION AND RELATED METHOD

(75) Inventors: Douglas W. Akers, Idaho Falls, ID (US); Mark W. Drigert, Idaho Falls, ID (US)

(73) Assignee: Batelle Energy Alliance, LLC, Idaho Falls, ID (US)

( * ) Notice: Subject to any disclaimer, the term of this patent is extended or adjusted under 35 U.S.C. 154(b) by 379 days.

(21) Appl. No.: 13/534,829

(22) Filed: Jun. 27, 2012

(65) Prior Publication Data
US 2014/0001365 A1 Jan. 2, 2014

(51) Int. Cl.
*G01T 1/10* (2006.01)
*G01T 1/20* (2006.01)

(52) U.S. Cl.
CPC .................... *G01T 1/2008* (2013.01)

(58) Field of Classification Search
CPC ....... G01T 1/2018; G01T 1/2006; G01T 1/20; G01T 1/1612
USPC ........................................................ 250/362
See application file for complete search history.

(56) References Cited

U.S. PATENT DOCUMENTS

| | | | |
|---|---|---|---|
| 3,988,615 A | 10/1976 | Umbarger | |
| 4,186,303 A | 1/1980 | Smith et al. | |
| 4,394,576 A * | 7/1983 | Tanaka et al. | 250/366 |
| 5,514,870 A | 5/1996 | Langenbrunner | |
| 5,841,140 A * | 11/1998 | McCroskey et al. | 250/363.03 |
| 6,392,236 B1 | 5/2002 | Maekawa et al. | |
| 6,452,191 B1 | 9/2002 | Johnson et al. | |
| 7,342,231 B2 | 3/2008 | Warburton et al. | |
| 7,683,334 B2 * | 3/2010 | Farsoni et al. | 250/367 |
| 2007/0263764 A1 | 11/2007 | Mccallum et al. | |

(Continued)

FOREIGN PATENT DOCUMENTS

| GB | 2409270 A * | 6/2005 |
|---|---|---|
| WO | 2008095257 A1 | 8/2008 |

OTHER PUBLICATIONS

U.S. Appl. No. 12/608,775, filed Oct. 29, 2009, entitled, "Apparatuses and Methods for Radiation Detection and Characterization Using a Multiple Detector Probe", to Akers et al.

(Continued)

*Primary Examiner* — Kiho Kim
(74) *Attorney, Agent, or Firm* — TraskBritt

(57) ABSTRACT

Apparatuses and a related method relating to radiation detection are disclosed. In one embodiment, an apparatus includes a first scintillator and a second scintillator adjacent to the first scintillator, with each of the first scintillator and second scintillator being structured to generate a light pulse responsive to interacting with incident radiation. The first scintillator is further structured to experience full energy deposition of a first low-energy radiation, and permit a second higher-energy radiation to pass therethrough and interact with the second scintillator. The apparatus further includes a plurality of light-to-electrical converters operably coupled to the second scintillator and configured to convert light pulses generated by the first scintillator and the second scintillator into electrical signals. The first scintillator and the second scintillator exhibit at least one mutually different characteristic for an electronic system to determine whether a given light pulse is generated by the first scintillator or the second scintillator.

28 Claims, 8 Drawing Sheets

(56) References Cited

U.S. PATENT DOCUMENTS

| | | |
|---|---|---|
| 2007/0290136 A1 | 12/2007 | Ivan |
| 2008/0017804 A1* | 1/2008 | Krishnamoorthy et al. .................. 250/370.05 |
| 2008/0249347 A1 | 10/2008 | Broda et al. |
| 2008/0315106 A1* | 12/2008 | Buchinsky ............... 250/370.09 |
| 2009/0261261 A1 | 10/2009 | Rodgers et al. |
| 2011/0204243 A1* | 8/2011 | Bendahan et al. ............ 250/367 |
| 2011/0275356 A1* | 11/2011 | Best et al. .................. 455/414.1 |
| 2012/0218376 A1* | 8/2012 | Athan .............................. 348/36 |

OTHER PUBLICATIONS

"Transuranic Radioactive Waste" DOE/NV—787 REV3 Oct. 2007—Department of Energy Nevada Site Office.

"Characterization Protocol for Radioactive Contaminated Soils" Office of Emergency and Remedial Repose Office of Radiation Programs, ANR-458 Publication 9380.1-10FS May 1992.

Hoodia, B. "Characterization of Radioactive Hazardous Waste" Journal of Radioanalytical and Nuclear Chemistry, vol. 243, No. 2 (2000) 551-553.

Hughes, M.B. "Successful Characterization of Radioactive Waste at the Savannah River Site" Department of Energy ForWaste Management 1995 at Tuscon Feb. 26, 1994-Mar. 2, 1995.

Usuda, et al., Phoswich detectors for Simultaneous counting of x-, β(y)-rays and Neutrons, Elsevier Science B.V., Nuclear Instruments and Methods in Physics Research A 388 (1997) 193-198.

* cited by examiner

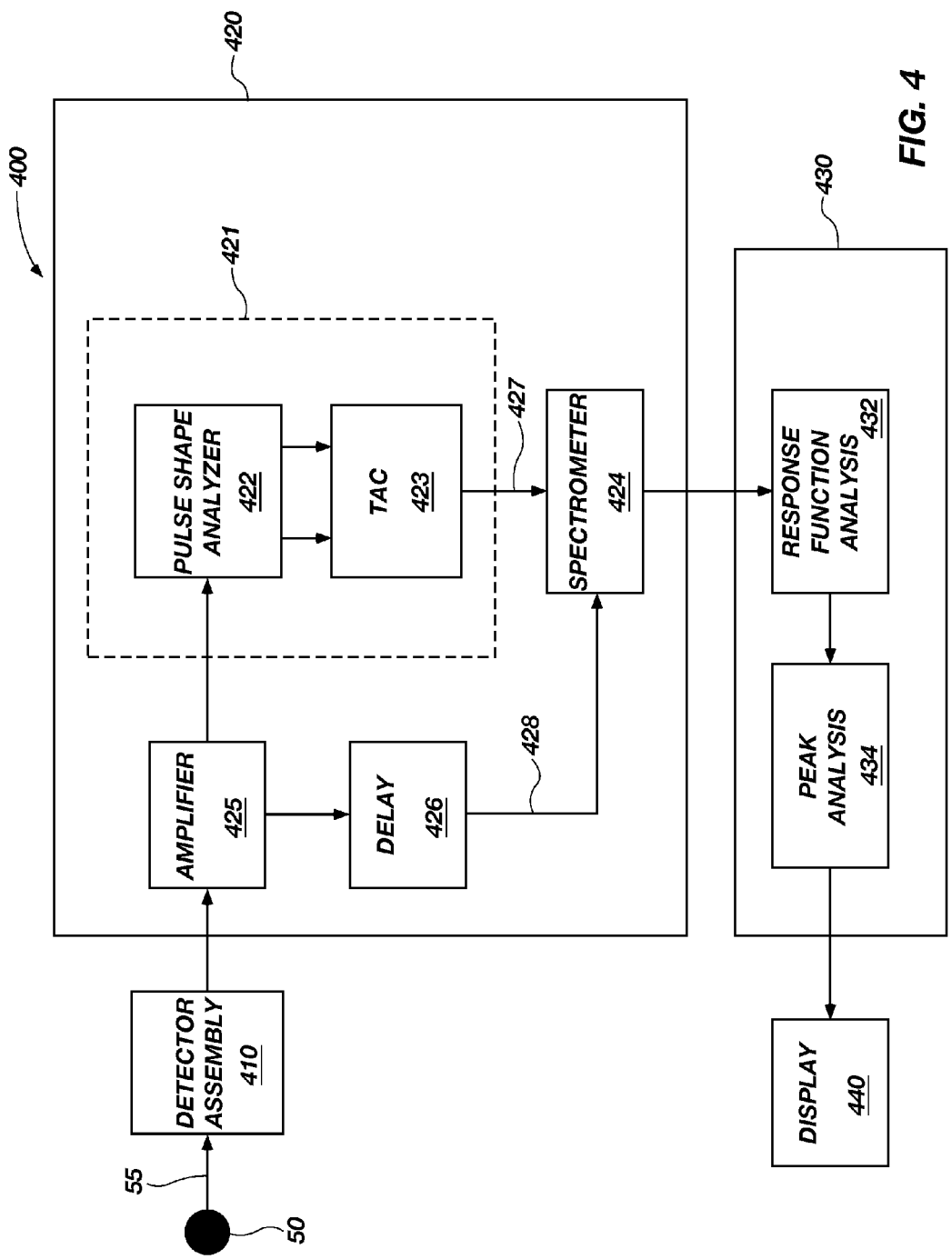

APPARATUSES FOR LARGE AREA RADIATION DETECTION AND RELATED METHOD

GOVERNMENT RIGHTS

This invention was made with government support under Contract Number DE-AC07-051D14517 awarded by the United States Department of Energy. The government has certain rights in the invention.

CROSS-REFERENCE TO RELATED APPLICATION

This application is related to U.S. patent application Ser. No. 12/683,904, entitled "Method, Apparatus and System for Low-Energy Beta Particle Detection," filed Jan. 7, 2010, now U.S. Pat. No. 8,274,056, issued Sep. 25, 2012, the disclosure of which is hereby incorporated by reference in its entirety.

TECHNICAL FIELD

Embodiments of the present disclosure relate generally to material detection and characterization of an environment and, more specifically, to a method, apparatus and system for detection and characterization of materials emitting low-energy beta particles.

BACKGROUND

Low-energy beta particle-emitting radionuclides, such as Technetium-99 (Tc-99), can be difficult to measure in the environment in which they are located. Tc-99 is one of the fission products with a relatively high yield in the thermal neutron fission of Uranium-235 (U-235) or Plutonium-239 (Pu-239), and Tc-99 has a long half-life of approximately $2.1 \times 10^5$ years. Tc-99 is found in the environment due to fallout from past atmospheric nuclear weapons tests and reactor fuel processing. In addition, Tc-99 is mobile in the environment, can move into groundwater, and may constitute a health hazard to humans if taken into the body. For these reasons, it may be desirable to be able to detect the presence of Tc-99. Conventional methods for detecting Tc-99 in soil include sampling the soil and running chemical tests on the soil to determine Tc-99 concentration.

Many conventional radiation detectors are designed to detect higher-energy emitting radionuclides, especially those radionuclides that emit gamma rays that travel a great distance due to the high energy of gamma rays. The only emissions that come from Tc-99 are low-energy beta particles, which absorb quickly and do not travel very far in air or soil. As a result, detectors designed to measure radioactive activity remotely, from a significant distance, may not be useful for detection of such low-energy beta particle-emitting radionuclides.

Further, conventional radiation detectors are not designed to discriminate between higher-energy radiation emitters and low-energy beta emitters, which may be either man-made or natural (e.g., K-40). Not being able to discriminate between these emitters makes it difficult to know what contribution of the radiation measured is attributable to Tc-99. Part of the difficulty in using conventional radiation detectors to detect such low-energy emitting radionuclides is due to the expected presence of a number of other radionuclides in the environment being examined, which presence may cause background interference. The background interference may be caused by high-energy gamma- or beta-radiation emitters interacting with the detector. Table 1, below, lists the nuclear properties of Tc-99 along with the expected contaminants and concentrations in an environment (e.g., the vadose zone) to be examined.

TABLE 1

| Radionuclide | Radiation and yield (%) | Beta Endpoint Energy (keV) | Gamma ray Energies (keV) | Expected Concentration (pCi/g) |
|---|---|---|---|---|
| Tc-99 | β-100% | 292 | Low yield gamma | 1-14,000 |
| Cs-137 | β--94% | 511 | 661 (6%) | 1 |
| K-40 | β--89% plus low yield positron emitter | 1300 | 1461 (11%) | 10-40 |
| U-235 | A 4-4.5 MeV β- -daughter products | | 142.8, 185 (46%) | 1-3 |
| U-238 | A-415 to 420 MeV β- -daughter products | | 1000 from daughter | 1-3 |
| Th-232 | A 3.8-4.0 MeV β- -daughter products | | Multiple gamma rays | 1-3 |
| Co-60 | β-100% low yield at 1500 | 318 | 1173 and 1332 | 2-20 |

As indicated by Table 1, a number of other contaminant radionuclides are expected to be present in the environment where Tc-99 may likely be present. These other radionuclides may include Cesium-137 (Cs-137), Potassium-40 (K-40), Uranium-235 (U-235), Uranium-238 (U-238), Thorium-232 (Th-232), and Cobalt-60 (Co-60). Other expected contaminant radionuclides not listed in Table 1, but discussed later, include Strontium-90 (Sr-90), Yttrium-90 (Y-90), and Tritium (H-3).

Referring again to Table 1, Tc-99 exhibits an essentially 100% yield of beta-particle emission with little to no gamma ray emission. The beta endpoint energy is the maximum energy beta particles have when the beta particles exit the nucleus before they scatter and lose some energy in the environment. As shown on Table 1, Tc-99 has the lowest beta particle endpoint energy of the radionuclides expected to be present in the target environment. The other radionuclides listed have various yields and energies of beta particle and gamma ray emissions. With the low-energy beta particle emission, the quick absorption of beta particles, and the existence of other higher-energy emitting radionuclides (both beta particles and gamma rays) in the environment causing background interference, detection of low-energy beta particle-emitting radionuclides, such as Tc-99, may prove difficult. This is especially true as Tc-99 is only a beta particle emitter, and no gamma rays, with their accompanying deeper penetration, are emitted.

Some conventional phoswich detectors have been used to discriminate between different types of radiation to determine which types of radiation are present (e.g., discriminate between alpha, beta, and gamma radiation); however, such detectors are not configured to discriminate between different sources of the same radiation type (e.g., between different beta emitters). The inventors have appreciated that there is a need to discriminate between sources of the same radiation type, including low-energy beta emitters such as Tc-99, and to do so in the environment where the radiation source exists without the need to take a material sample to run chemical analyses off-site in a laboratory.

BRIEF DESCRIPTION OF THE DRAWINGS

FIG. 4 is a hardware/software block diagram of a radiation detection and discrimination system for measuring a low-energy beta particle emitter in the presence of other beta and gamma radiation emitters according to an embodiment of the present disclosure;

DETAILED DESCRIPTION

Figure 1:
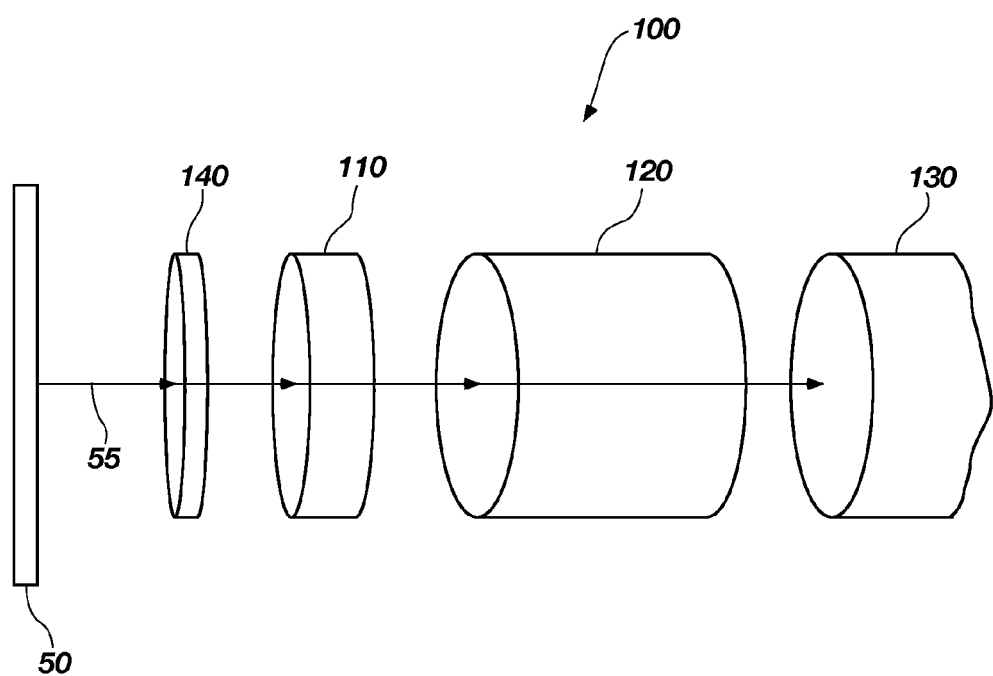
FIG. 1 is an exploded schematic view of a stacked configuration of a detector assembly according to an embodiment of the present disclosure.

In the following detailed description, reference is made to the accompanying drawings which form a part hereof and, in which is shown by way of illustration, specific embodiments in which the disclosure may be practiced. These embodiments are described in sufficient detail to enable those of ordinary skill in the art to practice that described in this disclosure, and it is to be understood that other embodiments may be utilized, and that structural, logical, and electrical changes may be made within the scope of the disclosure.

In this description, functions may be shown in block diagram form in order not to obscure the present disclosure in unnecessary detail. Furthermore, specific implementations shown and described are only examples and should not be construed as the only way to implement the embodiments of the present disclosure unless specified otherwise herein. It will be readily apparent to one of ordinary skill in the art that the various embodiments of the present disclosure may be practiced by numerous other partitioning solutions. For the most part, details concerning timing considerations, and the like, have been omitted where such details are not necessary to obtain a complete understanding of the present disclosure in its various embodiments and are within the abilities of persons of ordinary skill in the relevant art.

When executed as firmware or software, the instructions for performing the methods and processes described herein may be stored on a computer-readable medium. A computer-readable medium includes, but is not limited to, magnetic and optical storage devices such as disk drives, magnetic tape, CDs (compact discs), DVDs (digital versatile discs or digital video discs), and semiconductor devices such as RAM, DRAM, ROM, EPROM, and Flash memory.

Referring in general to the following description and accompanying drawings, various embodiments of the present disclosure are illustrated to show its structure and method of operation. Common elements of the illustrated embodiments are designated with like reference numerals. It should be understood that the figures presented are not meant to be illustrative of actual views of any particular portion of the actual structure or method, but are merely idealized representations employed to more clearly and fully depict the present disclosure defined by the claims below.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner In addition, unless stated otherwise, a set of elements may comprise one or more elements.

Embodiments of the present disclosure may include detecting specific low-energy radiation emissions and discriminating these emissions in the presence of other beta and gamma radiation emitters. One example of such a low-energy beta particle emitter is Tc-99. Because of Tc-99's low-energy beta particle emissions, and a radioactive yield of essentially 100% beta particle emissions, Tc-99 may be well-suited for detection with the apparatuses, methods, and systems described herein. However, embodiments of the disclosure may be applicable to other beta particle emitters. However, for ease of description, the non-limiting examples discussed herein will refer to Tc-99 as the beta emitter that is desired to be detected, and for which certain configurations and/or design decisions may be illustrated.

FIG. 1 is an exploded schematic view of a stacked configuration, which may also be characterized as an axial detection configuration, of a detector assembly 100 according to an embodiment of the present disclosure. Detector assembly 100 may include a first detector in the form of first scintillator 110, a second detector in the form of second scintillator 120, a light-to-electrical converter 130, and a guard element 140. The first scintillator 110 and the second scintillator 120 may be located adjacent one another such that at least a portion of light pulses generated within the first scintillator 110 filters into the second scintillator 120 and reaches the light-to-electrical converter 130. The light-to-electrical converter 130 is operably coupled to the second scintillator 120 in order to receive the light pulses generated within the first scintillator 110 or the second scintillator 120, and convert the light pulses into electrical signals for further analysis and/or storage by an electronic system. Light-to-electrical converter 130 may be a photomultiplier tube (PMT), photodiode, charge-coupled device (CCD), complementary metal-oxide semiconductor (CMOS) image sensor, or other suitable device for converting received light-to-electrical signals.

With the physically adjacent locations of the first scintillator 110 and the second scintillator 120, as well as with the transition to the light-to-electrical converter 130, the light pulses may experience some signal loss before the light pulses generated by the first scintillator 110 and the second scintillator 120 reach the light-to-electrical converter 130. One way to increase coupling (i.e., reduce coupling loss) at these transitions may be to use optical coupling grease, to bond the materials, or through other methods known in the art to better couple the light transmission from the surfaces between the first and second scintillators 110, 120. Signal losses in the light pulses may also be experienced inside individual scintillators 110, 120 themselves. Outer surfaces of the first and second scintillators 110, 120 may be prepared (e.g., polished or reflectively coated) in order to reduce the amount of light scatter out the sides of the scintillators 110, 120. Reducing losses from scattering may result in less uncertainty in detection, as more light pulses may be contained and received by the light-to-electrical converter 130.

A guard element 140 may also be coupled with an outer surface of the first scintillator 110, and be configured to protect the surface of the first scintillator 110. The guard element 140 may be further configured to act as a shield to prevent certain alpha and very low energy beta particles (e.g., H-3) from reaching the first scintillator 110 but to allow beta particles from Tc-99, and other higher-energy radiation to enter the first scintillator 110. Such alpha and beta particles may have a lower energy than the energy from the low-energy beta particle emitter (e.g., Tc-99) to be detected. It may be desirable for the detector assembly 100 to measure these lower-energy radiations. In that situation, a third scintillator (see FIG. 3) may be adjacent to the outer surface of the first scintillator 110 between (or in place of) the guard element 140 to measure and discriminate alpha particle emitters and low-energy beta emitters (e.g., H-3) from other low-energy beta emitters (e.g., Tc-99).

In operation, a radiation source 50 emits radiation 55, which is received by detector assembly 100. The radiation source 50 may be soil, air, or water, which substance is contaminated with at least one of a number of radionuclides including, but not limited to, Tc-99, H-3, Sr-90, Y-90, Cs-137, Co-60, Th-232, K-40, U-235, and U-238. These radionuclides may also be referred to herein for convenience as radiation sources 50. Such radiation sources 50 may emit radiation 55 including alpha particles, beta particles, and gamma rays. When radiation 55 passes through some material, there is some probability that the radiation 55 will interact with the material and lose some energy. Low-energy radiation has a high probability of interaction at short distances, and higher-energy radiation will have some lower probability for interactions at short distances from the radiation source 50.

Radiation 55 interacts with the first and second scintillators 110, 120, which generate light pulses responsive to low-energy beta particles, high-energy beta particles, and gamma rays. These light pulses are received by the light-to-electrical converter 130 for conversion to electrons that may be processed by electronic hardware and software (see FIG. 4) for analysis and storage. The first and second scintillators 110, 120 exhibit at least one mutually different, distinguishing characteristic in the detector assembly 100 response such that the electronic hardware and software can determine which light pulses were generated in the first scintillator 110 and which light pulses were generated in the second scintillator 120 and the energy of those light pulses. An example of such a distinguishing characteristic is the pulse shape characteristic (i.e., rise time) for the light pulses respectively generated in the crystals of the first and second scintillators 110, 120. The rise time is a characteristic of the chemical characteristics of the scintillator material, commonly termed the "element." Scintillator materials may comprise crystals, plastics, or other materials that exhibit the property of luminescence. As between specific types of radiation (e.g., beta, alpha, gamma) the scintillator material will have the substantially same rise time regardless of the source strength of radiation 55. For each particular type of radiation, each of the first and second scintillators 110, 120 will exhibit particular pulse shape characteristics, which the electronics may be configured to recognize. Because the electronics may also be configured to measure the rise time of the light pulses, the relative pulse contribution from each of first and second scintillators 110, 120 may be determined. Further, the energy of the pulses generated in both the first and second scintillators 110, 120 may also be measured, thereby allowing discrimination to be performed both based on rise time and deposited energy.

The energy of the beta particles emitted by Tc-99 is low compared to other radiation 55 in the environment, and the first scintillator 110 is structured to permit substantially all of the beta particle energy deposition of the Tc-99. The first scintillator 110 is also structured to permit other radiation 55 to be passed therethrough to the second scintillator 120 in order to interact in the second scintillator 120. Because all, or substantially all, the Tc-99 is deposited in the first scintillator 110, the beta particle emissions from Tc-99 may not reach into the second scintillator 120. In other words, the first scintillator 110 may be customized for the detection of a specific low-energy beta particle source (e.g., Tc-99).

The first scintillator 110 may be structured with a thickness, for the selected material thereof, such that a majority of the beta particle energy from the low-energy beta particle source will interact within the material of the first scintillator 110. This thickness may be selected based on the material chosen for the first scintillator 110 to ensure a goal of full energy deposition of Tc-99 in the first scintillator 110. For example, if customized to determine the amount of Tc-99 in an environment, this structure ensures that the vast majority, if not all, of the Tc-99 beta particle emissions are detected in the first scintillator 110, and that only minor amounts, if any at all, of the Tc-99 beta particle emissions are detected in the second scintillator 120. While the first scintillator 110 may be structured to have a thickness such that a vast majority of beta particle energy from Tc-99 will interact within the material of the first scintillator 110, the first scintillator 110 thickness may not be overly thick such that the energy of other, higher-energy beta particles is fully deposited in the first scintillator 110. The first scintillator 110 may, therefore, be structured with a thickness such that the other radiation emissions expected in the environment (e.g., gamma rays, higher-energy beta particles) can pass to the second scintillator 120. However, it may be desirable for the second scintillator 120 to be of sufficient thickness to have the energy of at least other, higher-energy beta particles be fully deposited. For example, the second scintillator 120 may have a thickness (e.g., 2.1 cm) for detection of higher-energy beta particles (e.g., >300 keV) and gamma rays. The selected thickness may be based on the material chosen for the second scintillator 120 to ensure a goal of full energy deposition of higher-energy beta particles and other expected radiation, such as gamma rays, interacting with the second scintillator 120. Selecting the thickness of second scintillator 120 for full energy deposition of high-energy beta particles based on the material chosen for second scintillator 120 allows both rise time and energy discrimination to be more accurately performed and quantified. For example, full energy deposition in the second scintillator 120 may permit discrimination of high-energy beta emitters (e.g., Sr-90).

Beta particle and gamma ray interactions in the second scintillator 120 may be used as anticoincidence triggers to remove higher-energy beta particle or gamma interactions from the data obtained from the first scintillator 110. For example, pulses in second scintillator 120 that occur substantially simultaneously with pulses in the first scintillator 110 may be considered to have been generated by the same radiation source 50. Because the first scintillator 110 is structured to have all, or substantially all, of the energy of Tc-99 deposited therein, these substantially simultaneous pulses in the second scintillator 120 and the first scintillator 110 can be assumed to be from a radiation source other than Tc-99. As a result, the simultaneous pulses detected by both the first scintillator 110 and the second scintillator 120 may be subtracted from the total response from the first scintillator 110, because such anticoincidence data detected in the second scintillator 120 indicates that the corresponding pulses in the first scintillator 110 resulted from interactions of higher-energy sources passing through the first scintillator 110 into the second scintillator 120. Because of the different penetrations of the different types of radiation 55, the unique energy characteristics of the different radiation sources 50, and mutually different characteristics of the first and second scintillators 110, 120, the light pulses from the first scintillator 110 and second scintillator 120 may be used to discriminate Tc-99 from the other background radiation. For example, the pulses detected in the first scintillator 110, which can be attributed to the gamma rays, may be subtracted out from the total response in the first scintillator 110 based on the timing of the response in both scintillators in order to isolate the detection of low-energy beta particles (e.g., Tc-99). It should be noted that "pulses" may be referred to as an analog signal generated when radiation interacts with scintillators, while "counts" may be referred to as a digital representation of a pulse generated during processing and analysis of the measured response from a detector assembly. However, at times, "pulses" and "counts" may be used interchangeably to refer generally to information generated as a result of interactions with one or more of the scintillators.

Examples of the scintillator materials used for the first and second scintillators 110, 120 may be selected from a plurality of plastic scintillator elements with different rise time characteristics, other crystalline scintillator materials, and other scintillation materials with suitable optical characteristics. Examples of plastic scintillator elements include the BC-400 series of plastic scintillator elements, which have polyvinyl toluene as the primary material. For example, a BC-404 plastic scintillator with a relatively fast pulse rise time and BC-444G with a relatively slow rise time may be used for the first and second scintillators 110, 120. Other crystalline scintillators may be used for one or both of the first and second scintillators 110, 120, which may include a cesium iodide (CsI) scintillator element and a europium doped calcium fluoride ($CaF_2$:Eu) scintillator element.

In one example, a BC-404 plastic scintillator element may be used for first scintillator 110. The BC-404 plastic scintillator element exhibits a relatively fast time constant of about 1.8 ns. The density of a BC-404 plastic scintillator element may be approximately 1.03 g/cm$^3$. A BC-444G plastic scintillator element may be used for the second scintillator 120. The BC-444G plastic scintillator element may exhibit a substantially slower rise time, with an overall time constant of about 285 ns. The element for the second scintillator 120 may be structured with a thickness for the detection of higher-energy beta particles, such as on the order of approximately >300 keV.

Although specific examples of scintillator elements are described herein, these are to be seen as non-limiting examples. For example, the pulse shape characteristic relationship between the first scintillator 110 and the second scintillator 120 may be reversed from what was just described. In other words, the first scintillator 110 may exhibit a slower rise time (e.g., BC-444G) whereas the second scintillator 120 may exhibit a faster rise time (e.g., BC-404). For ease of description, the pair of a BC-404 scintillator and a BC-444G scintillator is used in the description of several non-limiting exemplary embodiments herein; however, one skilled in the art will recognize that other materials, such as those mentioned above, and combinations of materials may be used, which are responsive to beta particles and have sufficiently different characteristics (e.g., rise times) from each other. Non-limiting examples of the other materials may include lithium glass scintillators, other crystalline scintillator materials with suitable optical properties such as CsI and $CaF_2$:Eu, and plastic scintillators such as BC-400, BC-408, BC-412, BC-416, BC-418, BC-420, BC-422, BC-444, BC-490, or other BC-400 series plastic scintillators with suitable properties.

These other materials that may be used for at least one of the scintillators have different time constants, including BC-400 (2.4 ns), BC-408 (0.9 ns), BC-412 (3.3 ns), BC-416 (4.0 ns), BC-418 (1.4 ns), BC-420 (1.5 ns), BC-422 (1.4 ns), BC-444 (285 ns), BC-490 (2.3 ns), CsI (16 ns), CsI:Na (630 ns), CsI:Tl (1000 ns) and $CaF_2$:Eu (940 ns). Because each of the BC-400 series of plastic scintillators has polyvinyl toluene as the primary material, the density for each of the BC-400 series of plastic scintillators is about 1.03 g/cm$^3$. The $CaF_2$:Eu material has a density of about 3.18 g/cm$^3$. CsI has a density of about 4.51 g/cm$^3$. The BC-400 series plastic scintillator elements, the CsI scintillator element, and the $CaF_2$:Eu scintillator element are available from Saint-Gobain Crystals of Hiram, Ohio.

One factor affecting the configuration of the detector assembly 100 is the determination of how far radiation 55 can pass through certain materials for full energy deposition. Radiation 55 may not travel as far through dense material as through less dense material. The thickness for the first scintillator 110 may be based on the energy deposition of the low-energy beta particles in the material used for the first scintillator 110. Basing thickness of the first scintillator 110 on the energy deposition of the low-energy beta particle emitter in the chosen material of the first scintillator 110 ensures that the energy from the beta particles from the low-energy beta particle emitter to be detected will substantially, if not all, be deposited in the first scintillator 110. The distances for full energy deposition of various radionuclides for different materials are indicated in Table 2. The values listed in Table 2 are derived from the NIST (National Institute of Standards and Technology) ESTAR program used to determine stopping power and range for radiation in various materials.

TABLE 2

| Material | Radionuclide | End Point Energy (MeV) | CSDA * Range (cm$^2$/g) | Density (cm$^3$/g) | Full Energy Deposition (cm) |
|---|---|---|---|---|---|
| Soil (SiO$_2$) | Tc-99 | 0.29 | 1.00E−01 | 1.3 | 7.69E−02 |
| | K-40 | 1.31 | 7.00E−01 | 1.3 | 5.38E−01 |
| | Cs-137 | 0.51 | 2.14E−01 | 1.3 | 1.65E−01 |
| | Sr-90 | 0.55 | 2.42E−01 | 1.3 | 1.86E−01 |
| | Y-90 | 2.28 | 1.30E+00 | 1.3 | 1.00E+00 |
| | H-3 | 0.0186 | 1.00E−03 | 1.3 | 7.69E−04 |
| Air | Tc-99 | 0.29 | 9.50E−02 | 1.21E−03 | 7.88E+01 |
| | K-40 | 1.31 | 6.45E−01 | 1.21E−03 | 5.35E+02 |
| | Cs-137 | 0.51 | 2.00E−01 | 1.21E−03 | 1.66E+02 |
| | Sr-90 | 0.55 | 2.27E−01 | 1.21E−03 | 1.88E+02 |
| | Y-90 | 2.28 | 1.23E+00 | 1.21E−03 | 1.02E+03 |
| | H-3 | 0.0186 | 8.00E−04 | 1.21E−03 | 6.64E−01 |
| BC-400 series | Tc-99 | 0.29 | 8.40E−02 | 1.03 | 8.16E−02 |
| | K-40 | 1.31 | 6.00E−01 | 1.03 | 5.83E−01 |
| | Cs-137 | 0.51 | 1.80E−01 | 1.03 | 1.75E−01 |
| | Sr-90 | 0.55 | 2.03E−01 | 1.03 | 1.97E−01 |
| | Y-90 | 2.28 | 1.13E+00 | 1.03 | 1.10E+00 |
| | H-3 | 0.0186 | 7.50E−04 | 1.03 | 7.28E−04 |
| CaF$_2$:Eu | Tc-99 | 0.29 | 1.04E−01 | 3.18 | 3.27E−02 |
| | K-40 | 1.31 | 7.50E−01 | 3.18 | 2.36E−01 |

TABLE 2-continued

| Material | Radionuclide | End Point Energy (MeV) | CSDA* Range (cm²/g) | Density (cm³/g) | Full Energy Deposition (cm) |
|---|---|---|---|---|---|
| | Cs-137 | 0.51 | 2.23E−01 | 3.18 | 7.01E−02 |
| | Sr-90 | 0.55 | 2.54E−01 | 3.18 | 7.99E−02 |
| | Y-90 | 2.28 | 1.33E+00 | 3.18 | 4.18E−01 |
| | H-3 | 0.0186 | 1.08E−03 | 3.18 | 3.40E−04 |

* CSDA: continuous-slowing-down approximation.

As indicated in Table 2, the beta particle endpoint energy for Tc-99 is 292 keV. With this endpoint energy, effectively all beta particle energy will be deposited in about a 0.082 cm thickness of a BC-400 series scintillator (e.g., BC-404), measured transverse to a direction of incoming Tc-99 beta particles. As previously stated, the first scintillator 110 is structured to have substantially all the low-energy beta particle energy deposited, and to permit higher-energy beta particles to pass therethrough into the second scintillator 120. Consequently, the thickness of the first scintillator 110 for a given element material may be selected based on the full energy deposition of the low-energy beta particle emitter. If the BC-404 scintillator element is used as the first scintillator 110, and Tc-99 is to be detected, the thickness of the first scintillator 110 may be approximately 0.082 cm. As shown in Table 2, distances for full-energy deposition of beta particles in BC-404 (from radionuclides other than Tc-99) range from about 0.2 cm to 1 cm. A thickness of 0.2 cm may be used as an upper limit for the thickness of the first scintillator 110 so that higher energy beta particles may pass through the element of the first scintillator 110 to the second scintillator 120. Depending on the material chosen for the first scintillator 110, other structures (e.g., thicknesses) may be used based on the full energy deposition of the low energy beta particles for that material. For example, as indicated by Table 2, the full energy deposition of Tc-99 in $CaF_2$:Eu is about a 0.0372 cm thickness. Consequently, if the $CaF_2$:Eu material is used as the first scintillator 110, and Tc-99 is to be detected, the thickness of the first scintillator 110 may be approximately 0.0372 cm. Practical considerations such as cost, availability, machinability, etc., may play a role in material selection for the different, first and second scintillators 110, 120.

As might be expected, some beta particle activity from the other radiation contaminants may also deposit in the first scintillator 110 according to known probabilities, as higher-energy radiation 55 travels through the first scintillator 110. Consequently, if other beta particle emitters are present, considerable energy deposition will be expected to occur not only in the second scintillator 120 (e.g., BC-444G), but also in the first scintillator 110 (e.g., BC-404). It should be noted that alpha particles and beta particle emissions from H-3 are very low energy in comparison to the energies of other beta particle emissions, and are unlikely to penetrate the guard element 140 (10 mg/cm²) on the first scintillator 110.

It is recognized that there will be some standoff distance between the radiation source 50 and the surface of the first scintillator 110 of detector assembly 100. As indicated in Table 2, the distance for full energy deposition of Tc-99 in air is about 79 cm. This distance, in relation to an approximate 1 cm or so of air distance between the radiation source 50 and the first scintillator 110 as detector assembly 100 is contemplated to be used, indicates that the energy deposition in air is likely to have a minimal effect on efficiency of detector assembly 100 and be within the degree of uncertainty expected for the measurement.

In Table 2, $SiO_2$ is used to estimate energy deposition in soil, as $SiO_2$ is a suitable substitute material available in the ESTAR program. As indicated in Table 2, the Tc-99 full-energy beta particle deposition thickness in soil is less than 0.1 cm. The soil density (e.g., 1.3 g/cm³) used for this analysis is for a loose-pack soil, which may be expected as the detector assembly 100 is removed. The other radionuclides have full energy deposition in soil layers ranging from about 0.16 cm to 1 cm, thereby providing data on the radionuclide inventories needed for calculating the detector assembly 100 efficiencies and response functions used to reduce backgrounds for radionuclides other than Tc-99. These functions will be discussed later.

Figure 2:
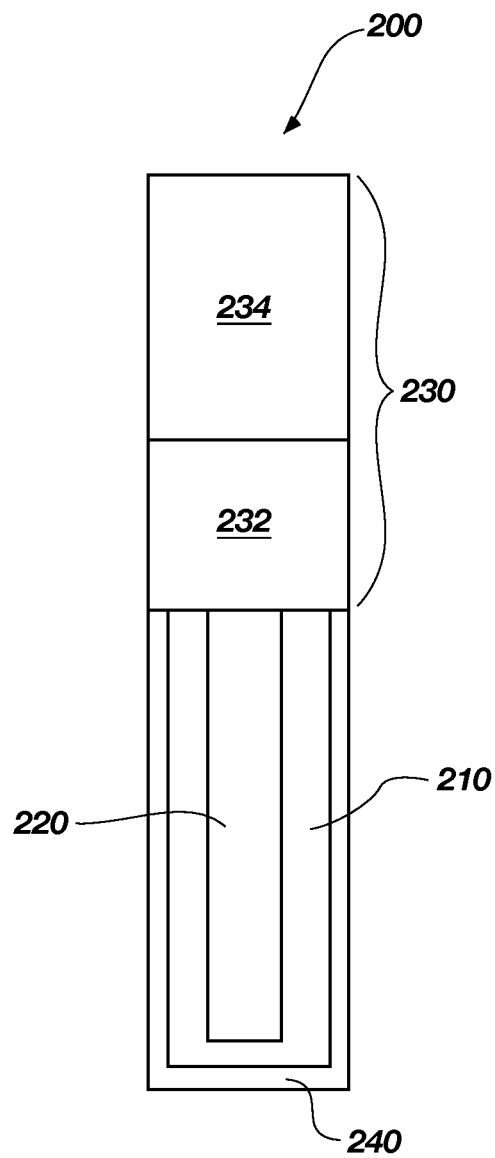
FIG. 2 is a schematic of a concentric configuration of a detector assembly according to an embodiment of the present disclosure.

FIG. 2 illustrates a concentric configuration, which may also be characterized as a circumferential detection configuration, of a detector assembly 200 according to an embodiment of the present disclosure. Detector assembly 200 includes a first detector in the form of first scintillator 210, a second detector in the form of second scintillator 220, and a light-to-electrical converter 230. Light-to-electrical converter 230 may be a photomultiplier tube, photo-diode, charge-coupled device (CCD), CMOS image sensor, or another suitable device for converting light-to-electrical signals. The light-to-electrical converter 230 in this example is a photomultiplier tube 232 with a voltage divider 234. Detector assembly 200 may also include a guard element 240.

Detector assembly 200 may be configured using components similar to those employed in the detector assembly 100 in FIG. 1 to the extent that the first scintillator 210 and the second scintillator 220 are operably adjacent, such that light generated in each scintillator 210, 220 responsive to beta particles may be received by the light-to-electrical converter 230. The first scintillator 210 is structured to experience full energy deposition of a low-energy beta particle emitter, and permit higher-energy beta particles to interact with the second scintillator 220. The second scintillator 220 may be structured to experience full energy deposition of the higher-energy beta particles. The thicknesses selected for the elements of the first scintillator 210 and second scintillator 220 may be based on the materials used for first scintillator 210 and second scintillator 220 and the respective distances for full energy deposition of the low-energy and higher-energy beta particle depositions.

One difference between the detector assembly of FIG. 2 and that of FIG. 1 is that the scintillators 210, 220 are configured in a concentric arrangement rather than a stacked arrangement. In a concentric arrangement, the second scintillator 220 may be cylindrical, and is surrounded by an annular first scintillator 210, rather than being coupled on one end. The detector assembly 200 may be used in a down-hole environment or in another environment where detection from the circumference of the detector assembly 200 may be desirable. It should be noted that, as illustrated, detector assembly 200 is configured to receive radiation not only from about its circumference, but also through a distal longitudinal end thereof. Such a concentric arrangement may be desirable for applications in which the detector assembly 200 is to detect in a contaminated test environment with radiation entering the detector assembly 200 from directions surrounding the detector assembly 220, such as in a subterranean test environment, water test environment, air test environment, etc. The concentric arrangement may provide the detector assembly 200 with the ability to remove the response from the second scintillator 220 from the first scintillator 210 regardless of the incoming direction of the incident radiation (not shown in FIG. 2).

The guard element 240 may extend around a side periphery of the detector assembly 200 to cover the side surface of the first scintillator 210, as well as around a distal longitudinal end thereof, as depicted in FIG. 2. As previously discussed, the guard element 240 may be structured to perform one or more functions. One function may be to provide protection to the outer surface of the first scintillator 210 such as during handling, or as the detector assembly 200 moves up and down within a cased or uncased subterranean borehole or other bore. For additional protection, other protective structures such as a wire grid (not shown) may be disposed about the outer surface of the detector assembly 200, over guard element 240. The guard element 240 may also be structured to shield alpha particles (e.g., from H-3) and lower-energy beta particles (e.g., lower than Tc-99) from depositing in the scintillators 210, 220, which alpha and lower-energy beta particles may otherwise add to background noise and cause interference with the measurement of the desired low-energy beta particles (e.g., Tc-99). Materials with shielding properties suitable for shielding low-energy beta (e.g., H-3) and alpha particles may be suitable for guard element 240, such as the polyester material, biaxially oriented polyethylene terephthalate (boPET), which may be available under the trade name, MYLAR®, from duPont de Nemours of Wilmington, Del. Other materials for guard element 240 may include aluminum or other thin materials that can shield the alpha or low-energy beta radiation and permit desired radiation to pass through to the first and second scintillators 210, 220. For example, the material used for guard element 240 may have a nominal stopping power of about 10 mg/cm$^2$ in order to stop the low-energy H-3 beta and alpha particles.

In this example, the light-to-electrical converter 230 comprises a photomultiplier tube 232 and a voltage divider 234. The voltage divider 234 applies a voltage to the different pins to get a relative potential on the back of the photomultiplier tube 232. When radiation in the form of light generated by first and second scintillators 210, 220 is received by the front of the photomultiplier tube 232, a signal comprising electrons is released when each light pulse hits a phosphorus material within the photomultiplier tube 232. In order to have enough electrons to be useful for processing electronics, these emitted electrons are multiplied by a series of stages in the photomultiplier tube 232 to amplify the signal before processing.

In operation, a tube may be driven or otherwise placed into the ground comprising a soil environment to be tested. Detector assembly 200 may be moved within the subterranean tube in order to detect radiation in situ. When measurements are obtained, the subterranean tube may be removed from the soil in order to provide more direct access to the test environment being measured. When the subterranean tube is removed from the soil environment to be tested, detector assembly 200 is left in close proximity to the surrounding soil with only a thin, and thus negligible, air gap therebetween for measurements. The subterranean tube may comprise apertures in the outer area of the subterranean tube to provide the detector assembly 200 with more direct access to the environment to be measured in the absence of the subterranean tube being removed from the soil during testing.

Examples have described use of a subterranean tube to be driven into the ground for testing of a soil environment. Alternatively, the detector assembly 200 may be used to test other environments (e.g., water, air, etc.). In an example of a water test environment, the detector assembly 200 may be placed in a tube and the detector assembly 200 may be moved throughout the water environment. The tube may comprise apertures to allow water to flow into the tube around the detector assembly 200 in order to have more direct access to the water test environment. Detector assembly 200 may be used without the assistance of a tube, and may be placed directly in the test environment. For each tested environment (e.g., soil, water, air, etc.) a plurality of detector assemblies 200 may also be used in spaced relationship to obtain a more widespread characterization (e.g., profile) of the test environment. The spaced relationship between the plurality of detector assemblies 200 may be within a single subterranean tube, separate tubes of a plurality of subterranean tubes, or other placement arrangements within the test environment. The spaced relationship between a plurality of nearby detector assemblies 200 may be one of a uniform or non-uniform relationship.

The radiation source 50 (FIG. 1) surrounding detector assembly 200 may commonly have some level of radioactive contamination. Because the detector assemblies described herein, such as detector assembly 200, are configured to detect low-energy beta particle emitters and discriminate between such emitters in the presence of other higher-energy beta particle and gamma radiation emitters, an accurate measurement of low-energy beta particles may be obtained without collecting a sample of the radiation source 50 and running chemical analyses in a laboratory.

Detector assemblies 100, 200 may each comprise a stand-alone detector assembly that may be configured in a stacked, or axial, configuration (e.g., FIG. 1) with a detection field at one axial end, or a concentric configuration (e.g., FIG. 2) for use in an environment (e.g., down-hole, air, water, etc.) with a circumferential detection field. A detector assembly 100, 200 may be incorporated in a cone penetrometer assembly to be pushed into the soil. A detector assembly 100, 200 may also be incorporated into a multiple detector probe assembly as one of the detectors therein, such as is described in, for example, U.S. patent application Ser. No. 12/608,775, which was filed on Oct. 29, 2009, now U.S. Pat. No. 8,878,140, issued Nov. 4, 2014, and entitled Apparatuses and Methods for Radiation Detection and Characterization Using a Multiple Detector Probe, the disclosure of which is incorporated herein in its entirety by this reference. Implementation of an embodiment of a detector assembly of the present disclosure within a multiple detector probe may use data processing, output files, and printout reports similar to those employed with the other detectors. Some modification to the software and interface of such a multiple detector probe may be desirable to fully integrate the data reception and analysis of a detector assembly 100, 200 as described herein into a multiple detector probe.

Figure 3:
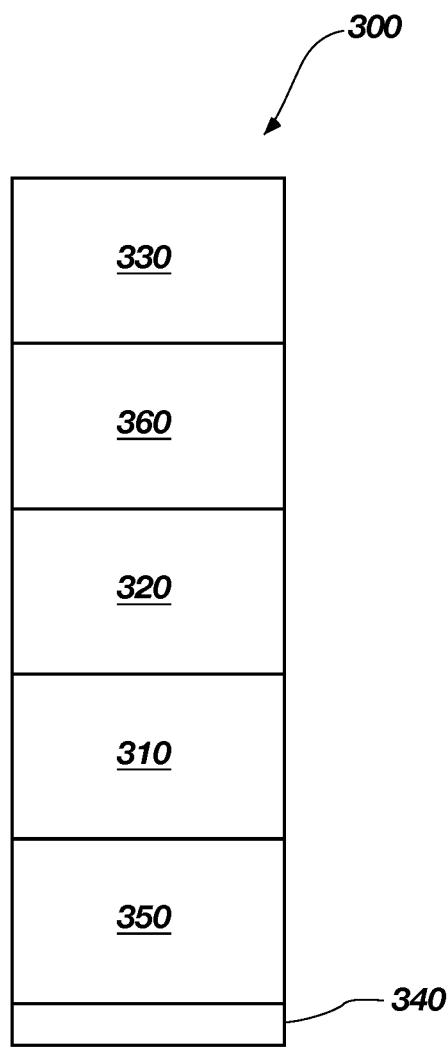
FIG. 3 is a schematic of a detector assembly with a third scintillator and a fourth scintillator according to an embodiment of the present disclosure.

Although the embodiments illustrated by FIGS. 1 and 2 show two scintillators, more scintillators may be used to further discriminate between beta particle emitters and/or other radiation emitters. For example, FIG. 3 is a schematic of a detector assembly 300 with a third scintillator 350 and a fourth scintillator 360 in addition to the first and second scintillators 310, 320 according to an embodiment of the present disclosure. In FIG. 3, third scintillator 350 may be adjacent to the outer surface of the first scintillator 310 between (or in place of) the guard element 340 to measure and discriminate alpha particle emitters and low-energy beta emitters (e.g., H-3) from other low-energy beta emitters (e.g., Tc-99). The fourth scintillator 360 may be adjacent to the second scintillator 320, such as between the second scintillator 320 and the light-to-electrical converter 330. Third and fourth scintillators 350, 360 may be in a stacked configuration such as is shown in FIG. 3, or near the center of the axis of a concentric configuration similar to that of FIG. 2, in order to differentiate between high-energy beta emitters and gamma emitters. Third and fourth scintillators 350, 360 may be configured with first and second scintillators 310, 320 such that one or more scintillators is stacked in relation to another scintillator and one or more scintillators is concentric in relation to another scintillator as part of the same detector assembly.

"Third" and "fourth" scintillators 350, 360 are used in order to distinguish from each other and from the first scintillator 310 and second scintillator 320. However, the existence of the fourth scintillator 360 is not dependent on the existence of the third scintillator 350 and vice versa. More scintillators may be used in order to increase resolution as to the number of beta emitters and other radiation sources to be distinguished. Each of these other scintillators may be structured for full energy deposition in the material chosen for a particular radiation source to be measured, and to allow higher-energy pulses to be subtracted from the total response based on, for example, anticoincidence triggers and pre-determined response functions.

FIG. 4 illustrates a hardware/software block diagram of a radiation detection and discrimination system 400 for measuring a low-energy beta particle emitter (e.g., Tc-99) in the presence of other beta and gamma radiation emitters according to an embodiment of the present disclosure. The discrimination system 400 may include a detector assembly 410, acquisition hardware 420, software modules 430, and a display 440. Acquisition hardware 420 may include an amplifier 425, delay 426, characteristic distinguisher 421, and spectrometer 424. As previously described, detector assembly 410 may employ at least two detectors, which may be in the form of scintillators with different characteristics (e.g., different pulse shapes such as rise times) such that the electronic hardware and software can determine which light pulses were generated in the first scintillator and which light pulses were generated in the second scintillator. If the different characteristic for the two scintillators includes a different rise time, the characteristic distinguisher 421 may include a pulse shape analyzer 422 and a time-to-amplitude converter (TAC) 423. Alternatively, a multi-parameter system (not shown) may be used in place of the spectrometer 424, the pulse shape analyzer 422, the TAC 423, or any combination thereof. The multi-parameter system may perform one or more of the functions of the spectrometer 424, pulse shape analyzer 422 or TAC 423, including recognizing and/or quantifying the pulses based on the rise time characteristics and energy levels of the pulses. Software modules 430 may be used to perform one or more analyses on the raw data from the detector assembly 410 and the acquisition hardware 420 to correlate rise time and energy response in both the first and second scintillators. Such analyses may include a response function analysis 432, and a peak analysis 434. As non-limiting examples, amplifier 425 may be an ORTEC® 460 amplifier, delay 426 may be an ORTEC® 427 delay amplifier, pulse shape analyzer 422 may be an ORTEC® 552 pulse shape analyzer, TAC 423 may be an ORTEC® 567 TAC single channel analyzer, spectrometer 424 may be an ORTEC® ASPEC-927 digital spectrometer, which are available in the ORTEC® product line from Advanced Measurement Technology, Inc. of Oak Ridge, Tenn. An example of a multi-parameter system is a MPA-3 series multi-parameter multi-channel analyzer system available from Quantar Technology Inc. of Santa Cruz, Calif.

In operation, detector assembly 410 receives radiation 55 from a radiation source 50. The detector assembly 410 may be configured as described herein with detectors in the form of a first scintillator and a second scintillator operably coupled such that light generated in each scintillator responsive to receipt of beta particles may be received by a light-to-electrical converter (see FIGS. 1 and 2, scintillators and light-to-electrical converter not shown in FIG. 4). The first scintillator is structured to experience full energy deposition of a low-energy beta particle emitter, and permit a higher-energy beta particle to pass and subsequently interact with the second scintillator. The second scintillator may be structured to experience full energy deposition of the higher-energy beta particle. The thicknesses selected for elements of the first scintillator and second scintillator may be based on the materials used for the first and second scintillators and the respective distances for full energy deposition of the low-energy and higher-energy beta particle depositions.

The interaction of the radiation 55 with the scintillators generates light that may be received by a light-to-electrical converter. The light-to-electrical converter converts light to electrons that may be processed by the additional hardware and software modules described herein. When light is generated by the detector assembly 410, the light generation event produces information, which is separated by the acquisition hardware 420 into two separate signals for analysis. These two signals, a timing signal 427 and an energy signal 428, are received by the spectrometer 424 or a multi-parameter system as discussed above. The timing signal 427 indicates which of the two scintillators generated a specific light pulse. This timing discrimination is based on the different rise times of the two scintillators. The energy signal 428 indicates the energy of the radiation 55 at the time of the scintillator interaction generating the light pulse. Each radiation source 50 has a characteristic radiation energy emission; however, according to some probability, lower- or higher-energy emissions that are uncharacteristic to a radiation source 50 may be produced by that radiation source 50. Although some Tc-99 beta particle emissions may be determined by measuring a number of pulses at its beta particle endpoint energy, some of the pulses at that energy are, in all probability, generated by other beta and gamma radiation emitters in the environment. Thus, without a capability for compensating for these extraneous pulses caused by higher-energy emitting radionuclides, the number of pulses for Tc-99 will be too high.

As previously discussed, the two scintillators of the detector assembly 410 have different signal characteristics (e.g., rise times of the signal are different). When a light pulse is generated by the detector assembly 410 there is a certain amount of time that elapses for a light pulse to propagate. Depending on which scintillator generates the light pulse, the rise-time characteristic of the light pulse is different. By looking at the rise times, the discrimination system 400 can determine which of the two scintillators contributed to that light pulse. Generally, only one or the other scintillator contributes to a given light pulse, but there is a possibility for a combination of both scintillators. Depending on the radiation source, the energy generated by the light pulse may also be different, enabling energy discrimination to be used for further analysis as described herein.

The pulse shape analyzer 422 (or a multi-parameter system) receives the signal that comes out of the detector assembly 410 (such as, for example, through an amplifier 425). The pulse shape analyzer 422 determines the rise time of the pulse coming from the detector assembly 410 and sends a start pulse and a stop pulse to the TAC 423. The start pulse is related to when the light pulse begins to generate in the detector assembly 410. The stop pulse is related to when the light pulse stops generating in the detector assembly 410. The TAC 423 receives the start pulse and stop pulse and calculates the time between those two events. The TAC 423 sends a signal to spectrometer 424, the amplitude of the signal being proportional to the time difference between the start and stop pulses related to the rise time to generate a given light pulse. This proportional amplitude-to-time information allows the spectrometer 424 to create a spectrum of the different time responses for the different scintillators of the detector assembly 410. The spectrometer 424 also receives energy information, which may be used to create a spectrum for the different energies levels received. The spectrometer 424 may combine the time and energy spectra such that the energy for each count can be determined for a count (i.e., light pulse), as well as in which scintillator the light pulse is generated for that count.

Some of the electronics used within the discrimination system 400 may operate on different time scales. Although these time scale differences may be small, unless they are reconciled, the system 400 may not function properly. A delay 426 may be needed so that the spectrometer 424 knows which specific timing signal 427 is associated with the corresponding energy signal 428. The delay 426 ensures that these signals are received by the spectrometer 424 at about the same time so that the related timing signal 427 and the energy signal 428 are processed at the same time. The spectrometer 424 then sends the corresponding time/energy information to the software modules 430 for further analysis. Examples of time/energy information will be illustrated in FIGS. 5A through 7B, and described herein.

Several ways are contemplated to reduce background effects in the first detector attributable to radionuclides other than Tc-99, and to separate out the Tc-99 pulses from extraneous pulses by higher beta and gamma emitters. One method includes using the rise-time discrimination between the first scintillator and the second scintillator to obtain anticoincidence data, as described above, to subtract out of the Tc-99 response of the first scintillator.

The software modules 430 receive the time/energy information from the spectrometer 424. This information may undergo a response function analysis 432 for radionuclides in the environment other than Tc-99, which may reduce the background effects in the first scintillator. The response function analysis 432 may help determine what percentage of the observed signal in the first scintillator is from Tc-99, and what percentage is from other higher-energy radiation emitters. The response functions for other specific contaminant radionuclides may be employed during the characterization of the detector to enable stripping of the spectrum of extraneous pulses in the Tc-99 response during data analysis. Such response functions may be determined through physical measurement, mathematical simulation, or both, for each of the different contemplated contaminant radionuclides to determine a proportion of pulses that generate in the first scintillator compared with the second scintillator.

Following the anticoincidence and response function analysis, quantitative peak shape data may be measured and used with appropriate calibration and efficiency functions to determine the quantity of Tc-99 present. Peak analysis 434 includes correcting the concentration for the overall detection efficiency of the detector assembly 410. The peak analysis 434 may relate the detector size and the ability of the detector to characterize Tc-99 concentrations in the environment being measured with acceptable count times. Calculations may be performed based on the expected concentrations of radionuclides in the environment where the measurements are to be performed to determine the expected efficiency and count rates for the Tc-99 detector. In this example, it is assumed that the available surface area for the Tc-99 measurement is the outer wall of the detector assembly 410 (e.g., 6.44 cm diameter×30 cm long). Another assumption is made that only beta particles from Tc-99 that can reach the detector assembly 410 are within the thickness related to full energy deposition in the first, or outer scintillator (e.g., approximately 0.082 cm). A third assumption is made that all beta particles that reach the face of the detector assembly 410 are detected. Consequently, the measurable amount of Tc-99 that can be detected lies within 0.076 cm of the surface of the environment (see Table 2) adjacent detector assembly 410 as the down-hole tube encompassing the detector assembly 410 is being removed from the soil. Based on the expected lower limits of detection (LLD) of the detector assembly 410 with the assumptions noted above, the expected Tc-99 count rate for the detector assembly 410 is about 350 counts/pCi for a 200 s count time. This may be an acceptable peak area to achieve appropriate counting statistics for a measurement, particularly if the required LLD is closer to 10 pCi/g.

Figure 5A:
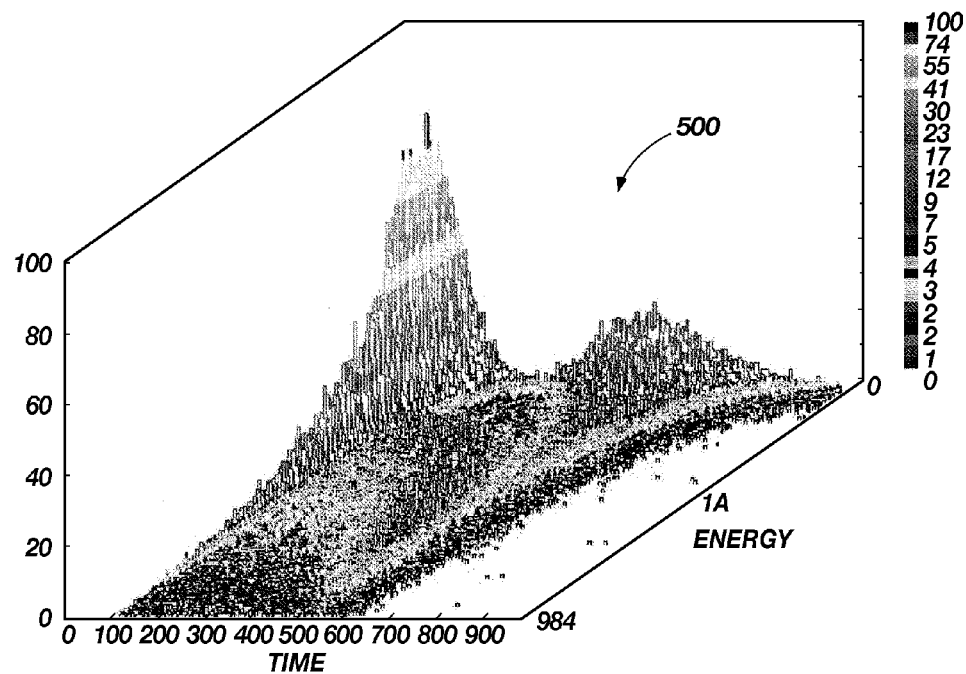
FIGS. 5A and 5B are plots of the time/energy spectrum of Tc-99 as measured by a detector assembly and as generated by a spectrometer according to an embodiment of the present disclosure.
Figure 5B:
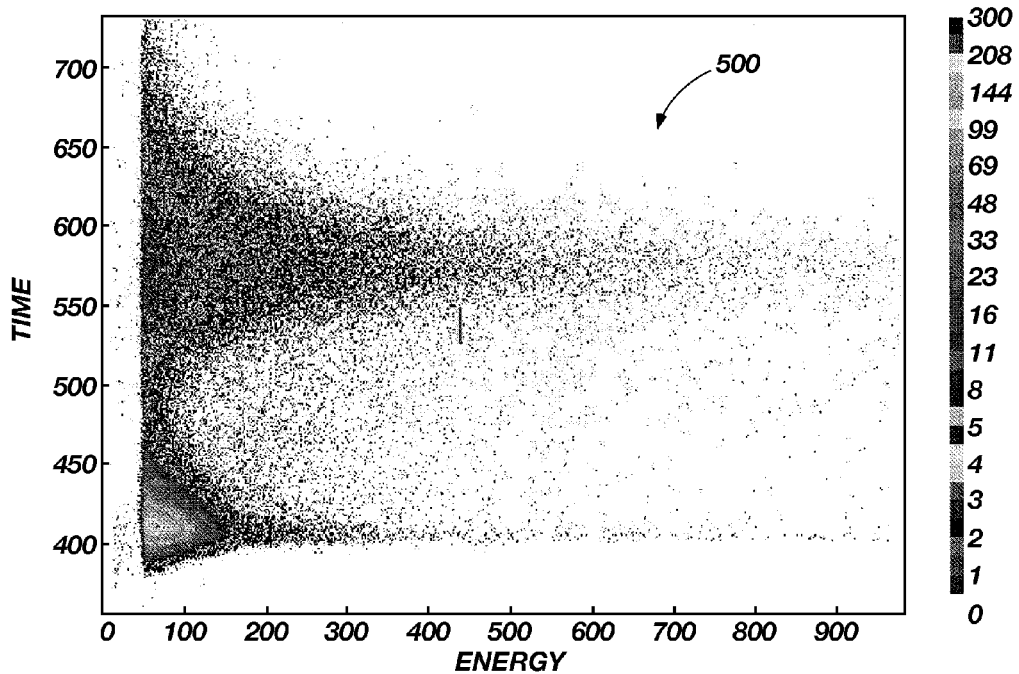

FIGS. 5A and 5B are plots of a time/energy spectrum 500 of Tc-99 as measured by a detector assembly and as generated by a spectrometer according to an embodiment of the present disclosure. FIG. 5A is a three-dimensional perspective plot for the time/energy spectrum 500 of Tc-99. The time axis is horizontal, the vertical axis relates to concentration of the counts, and the energy axis is orthogonal to the page. The rear, left-hand corner of the plot is the origin. FIG. 5B is a two-dimensional plot of the time/energy spectrum 500 for Tc-99. The time axis is vertical, and the energy axis is horizontal. It should be noted that the numbers associated with the axes of the series of plots correspond to channels of the spectrometer and not to any particular energy or time values.

As shown in FIG. 5B, there are two peaks in the spectrum. One peak is at about 400 and the other peak is at about 600 on the time axis scale. These peaks correspond to the spectra created that are proportional to the respective rise times of the first scintillator and the second scintillator. As shown in the three-dimensional plot of FIG. 5A, the counts in the peak near the origin are more concentrated because of the low energy and small energy range of the beta particles emitted by Tc-99. The presence of the weaker broader peak at higher time values indicate that there are extra counts in the Tc-99 peak arising from higher-energy emissions that would be subtracted out as an anticoincidence trigger, or as part of the response function analysis.

Figure 6A:
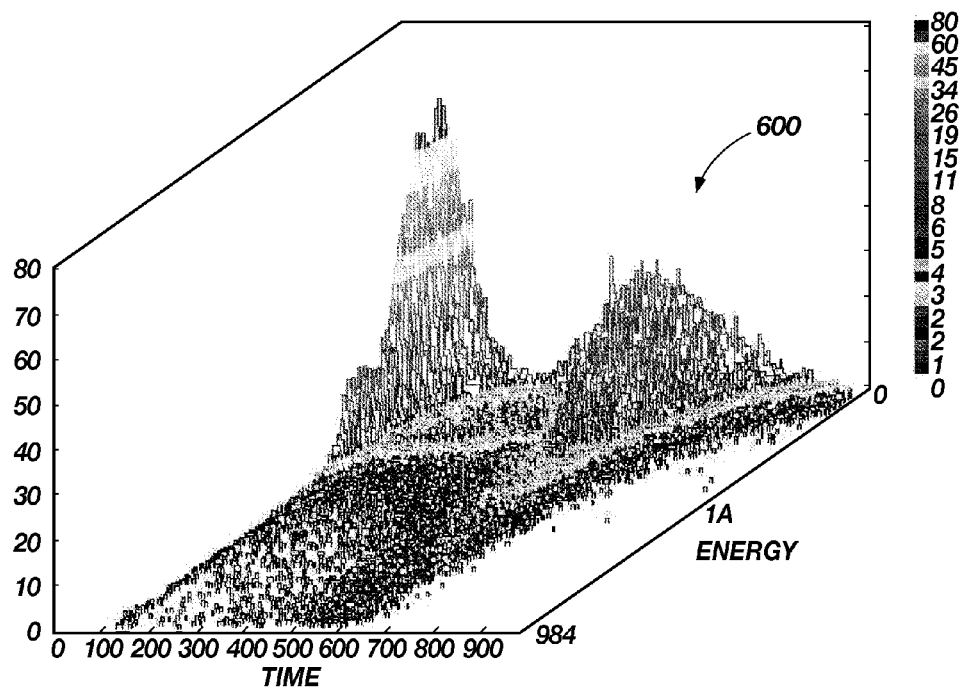
FIGS. 6A and 6B are plots of the time/energy spectrum of Sr-90 as measured by a detector assembly and as generated by a spectrometer according to an embodiment of the present disclosure.
Figure 6B:
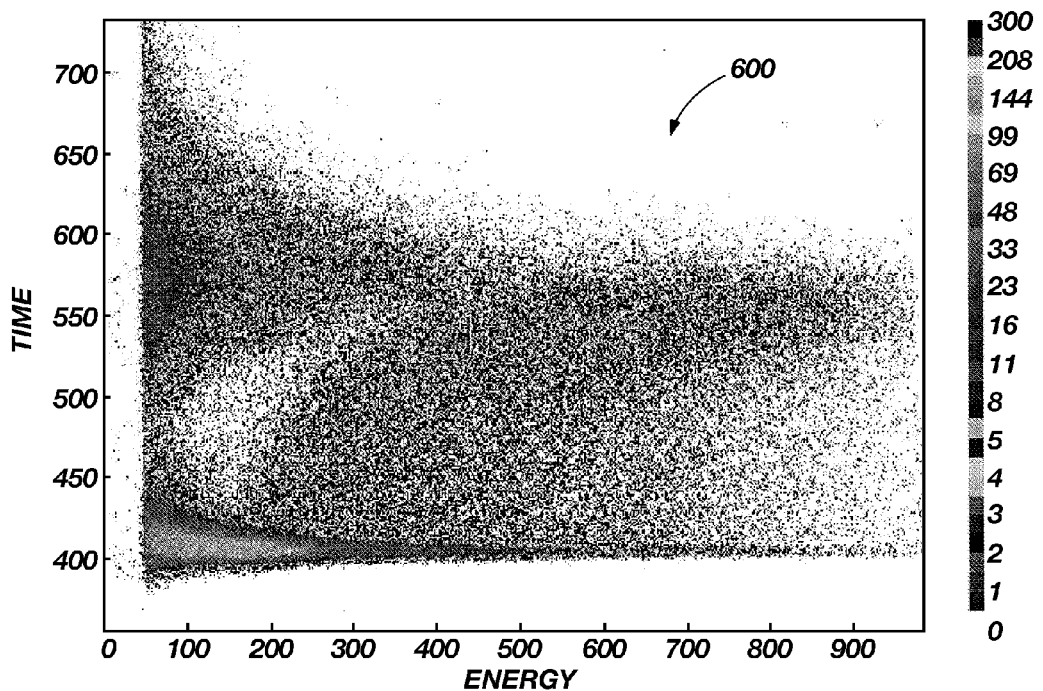

FIGS. 6A and 6B are plots of a time/energy spectrum 600 of Sr-90 as measured by a detector assembly and as generated by a spectrometer according to an embodiment of the present disclosure. FIG. 6A is a three-dimensional plot for the time/energy spectrum 600 of Sr-90. The time axis is horizontal, the vertical axis relates to concentration of the counts and the energy axis is orthogonal to the page. The rear left-hand corner of the plot is the origin. FIG. 6B is a two-dimensional plot of the time/energy spectrum 600 for Sr-90. The time axis is vertical, and the energy axis is horizontal. As shown, there are two peaks in the spectrum. One peak is at about 400 and the other peak is at about 600 on the time axis scale. These peaks correspond to the spectra created that are proportional to the respective rise times of the first scintillator and the second scintillator. As shown in the three-dimensional plot of FIG. 6A, the counts in the peak near the origin are concentrated heavily in the first scintillator and the second scintillator, with many more counts showing up in the second scintillator response as shown in FIG. 6B, similar to those shown in the previous FIG. 5B with respect to Tc-99. The high concentration of counts in both the first scintillator and the second scintillator response indicates that the radiation energy of Sr-90 is enough to carry many beta particles into the second scintillator; however, many interactions still occur in the first scintillator. During response function analysis, it may be determined how many counts of Sr-90 should be expected so that those counts may be stripped from the apparent spectrum of the Tc-99.

Figure 7A:
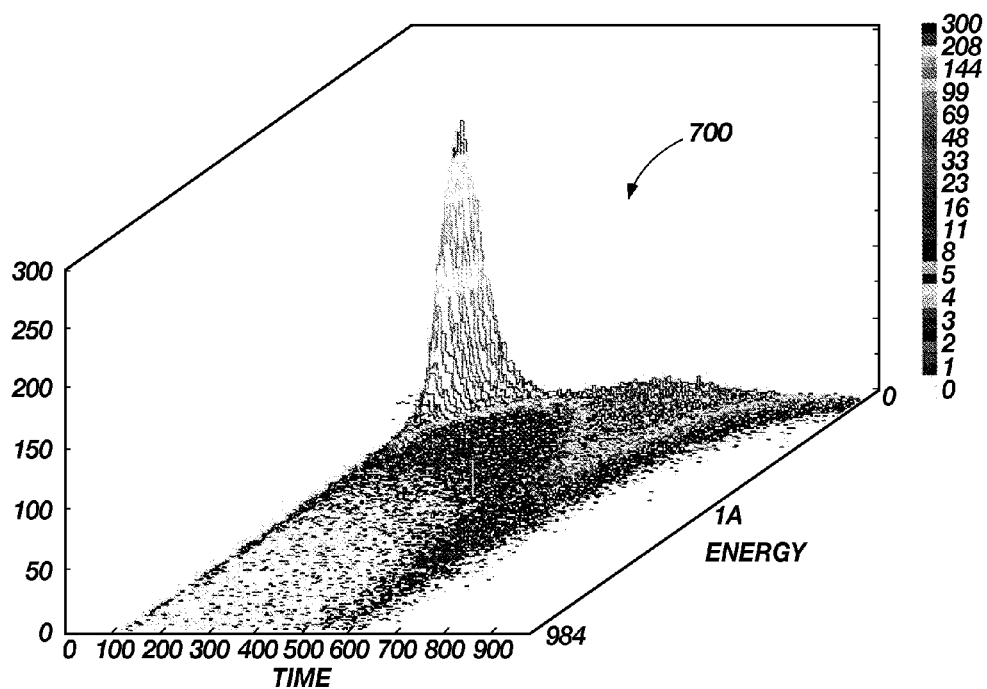
FIGS. 7A and 7B are plots of the time/energy spectrum of Cs-137 as measured by a detector assembly and as generated by a spectrometer according to an embodiment of the present disclosure.
Figure 7B:
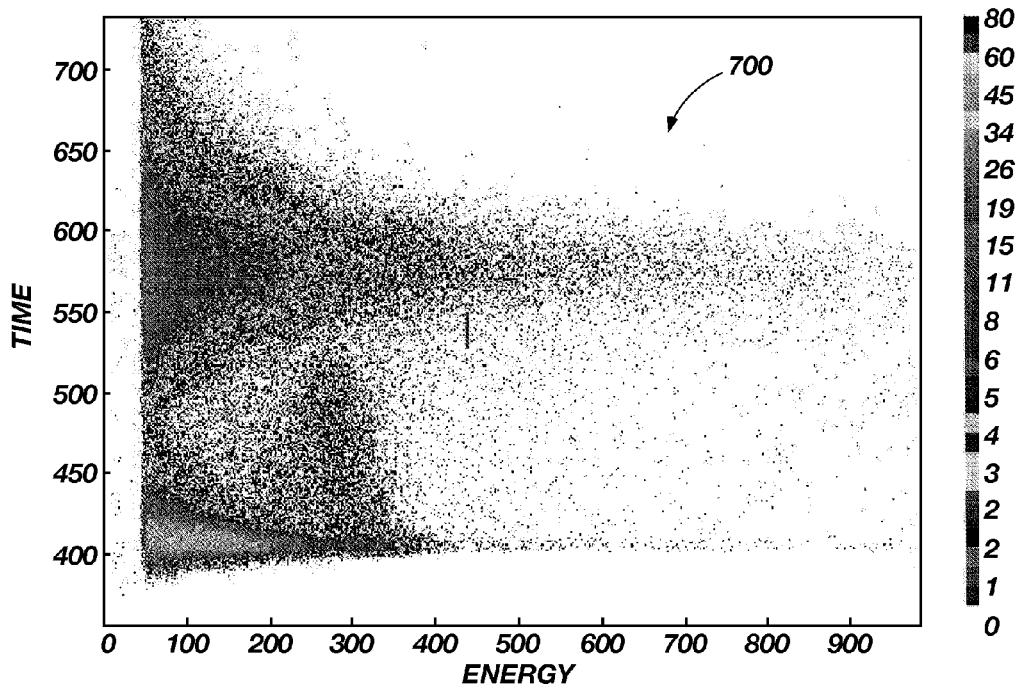

FIGS. 7A and 7B are plots of a time/energy spectrum 700 of Cs-137 as measured by a detector assembly and as generated by a spectrometer according to an embodiment of the present disclosure. FIG. 7A is a three-dimensional plot for the time/energy spectrum 700 of Cs-137. The time axis is horizontal, the vertical axis relates to the concentration of the counts and the energy axis is coming out of the page. The rear left-hand corner of the plot is the origin. FIG. 7B illustrates a two-dimensional plot of the time/energy spectrum 700 for Cs-137. The time axis is vertical, and the energy axis is horizontal. As shown, there are two peaks in the spectrum. One peak is at about 400 and the other peak is at about 600 on the time axis scale. These peaks correspond to the spectra created that are proportional to the respective rise times of the first scintillator and the second scintillator. As shown in the three-dimensional plot of FIG. 7A, the counts in the peak near the origin are concentrated heavily in the first scintillator and the second scintillator, with many more counts showing up in the response of the second scintillator as shown in FIG. 7B, similar to those shown in the previous FIGS. 5A and 5B with respect to Tc-99. The high concentration of counts in both the first scintillator and the second scintillator response indicates that the radiation energy of Cs-137 is enough to carry many beta particles into the second scintillator; however, many interactions still occur in the first scintillator. During response function analysis, it may be determined how many counts of Cs-137 should be expected so that those counts may be stripped from the apparent spectrum of the Tc-99.

Figure 8:
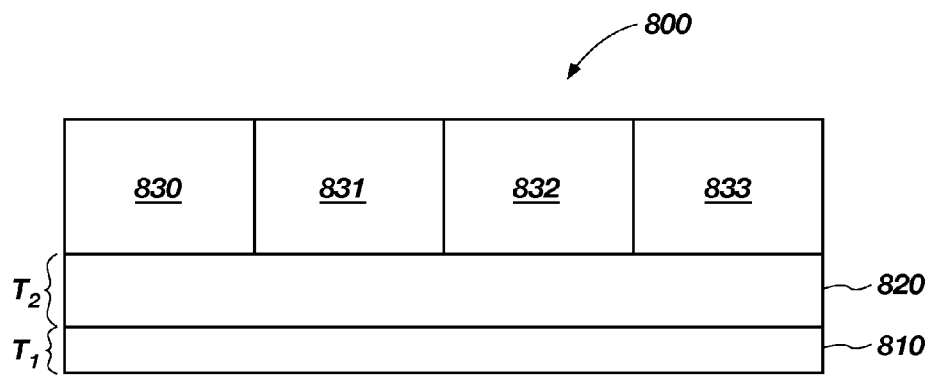
FIG. 8 is a schematic diagram of a large area radiation detector system according to an embodiment of the present disclosure.

FIG. 8 is a schematic diagram of a large area radiation detector system 800 according to an embodiment of the present disclosure. The large area radiation detector system 800 may also be referred to herein as a large area beta-gamma detector system (LABS) 800. The LABS 800 includes a first detector in the form of a first scintillator 810 and a second detector in the form of a second scintillator 820. The first scintillator 810 and the second scintillator 820 may be adjacent one another in a stacked configuration. The LABS 800 may further include a plurality of a light-to-electrical converters 830, 831, 832, 833 adjacent to the second scintillator 820. The first scintillator 810 and the second scintillator 820 may be positioned adjacent one another such that at least a portion of light pulses generated within the first scintillator 810 filters into the second scintillator 820 and reaches the plurality of light-to-electrical converters 830, 831, 832, 833. The plurality of light-to-electrical converters 830, 831, 832, 833 are each operably coupled to the second scintillator 820 in order to receive the light pulses generated within the first scintillator 810 or the second scintillator 820, and convert the light pulses into electrical signals for further processing, analysis, and data storage by an electronic system. The plurality of light-to-electrical converters 830, 831, 832, 833 may be configured as one or more of a photomultiplier tube (PMT), a photodiode, a charge-coupled device (CCD), a CMOS image sensor, or other suitable device for converting received light-to-electrical signals. While four light-to-electrical converters 830, 831, 832, 833 are shown in FIG. 8, any number of light-to-electrical converters may be employed depending on the surface area of the LABS 800.

The LABS 800 may further include a guard element (not shown) that may be structured similar to the guard element 140 described above with reference to FIG. 1, for example, to filter certain low energy radiation from entering into the first scintillator 810, as well as suppressing other background effects from the soil. The additional description referring to FIG. 1 may also be applicable to the LABS 800 of FIG. 8, such as, for example, methods of bonding the various materials (e.g., using optical coupling grease), preparing (e.g., polishing, coating, etc.) surfaces of the materials, as well as the selection of scintillator materials used for the first scintillator 810 and the second scintillator 820, to exhibit different timing characteristics. Therefore, further description regarding the different materials and manufacturing methods of the LABS 800 is not repeated with respect to the embodiment of FIG. 8.

As discussed above, radiation (not shown) interacts with the LABS 800, which generates light pulses in the first scintillator 810 and the second scintillator 820. These light pulses are received by the plurality of light-to-electrical converters 830, 831, 832, 833 for conversion to electrons that may be received by electronic hardware and software (see FIG. 4) for processing, analysis, and data storage. The first and second scintillators 810, 820 exhibit at least one mutually different, distinguishing characteristic in the detector response such that the electronic hardware and software may determine which light pulses were generated in the first scintillator 810 and which light pulses were generated in the second scintillator 820, as well as the energy of those light pulses. An example of such a distinguishing characteristic is the pulse shape characteristic (i.e., rise time) for the light pulses respectively generated in the crystals of the first and second scintillators 810, 820. Because the electronics may also be configured to measure the rise time of the light pulses, the relative pulse contribution from each of first and second scintillators 810, 820 may be determined Further, the light energy of the pulses generated in both the first and second scintillators 810, 820 may also be measured, such as by combining the timing and energy data received from the first and second scintillators 810, 820, as discussed above. As a result, discrimination of particular radionuclides of interest may be performed both based on rise time and deposited energy. For example, the timing data taken from each of the first and second scintillators 810, 820 may be correlated with the energy spectrum obtained. Background effects from primary background radionuclides may be subtracted from the detector response based on both the scintillator in which the energy deposits, and the background suppression from other scintillators that are expected to capture the radiation from the particular radionuclide of interest.

The first and second scintillators 810, 820 may be structured (e.g., customized) such that the receiving electronic hardware and software may perform energy discrimination and background suppression on the light response from each of the scintillators 810, 820. In other words, the thicknesses ($T_1$, $T_2$) of the first and second scintillators 810, 820 may be dependent on the radionuclide desired to be measured. For example, the first scintillator 810 may be structured to permit substantially all of the energy deposition of a particular low-energy radionuclide. In other words, the thickness ($T_1$) of the first scintillator 810 may be selected, for the particular material thereof, such that a majority of the energy from the low-energy radionuclide will interact within the material of the first scintillator 810 to ensure a goal of full energy deposition in the first scintillator 810 for energy from a particular radionuclide of interest. Because all, or substantially all, of the energy of the particular low-energy radionuclide is deposited in the first scintillator 810, the emissions from that particular low-energy radionuclide may not reach into the second scintillator 820. The first scintillator 810 may also structured to permit other radiation to be passed therethrough to the second scintillator 820 in order to interact in the second scintillator 820.

The second scintillator 820 may have a thickness for detection of higher-energy radiation, such as high energy beta particles (e.g., >300 keV) and gamma rays. The selected thickness ($T_2$) for the second scintillator 820 may be based on ensuring a goal of full energy deposition of other expected radiation exhibiting higher energies. Selecting the thickness of second scintillator 820 for full energy deposition of high-energy radiation based on the material chosen for second scintillator 820 allows both rise time and energy discrimination to be more accurately performed and quantified, even among radionuclides that emit the same radiation type. For example, beta particles from one radionuclide may be deposited in the first scintillator 810, while beta particles from another radionuclide may be deposited in the second scintillator 820. Examples of primarily beta-emitting or low-energy gamma ray radionuclides that may be detected and discriminated from each other include Tc-99, H-3, Sr-90, Y-90 C-14, and I-129. In addition, gamma ray emitting radionuclides that can be detected in the detector and discriminated from the beta emitting radionuclides include Cs-137, Co-60, K-40, U-235, U-238, and Am-241.

The LABS 800 may be configured to have a detector area that is relatively larger than the detector assemblies of FIGS. 1 through 3. The LABS 800 may include large-area cast plastic scintillators. For example, the surface area of the LABS 800 may be in the square meter range. As a result, the LABS 800 may be better suited for detection of radionuclides over a large area, such as being used to scan a large land region for a range of low-energy beta and gamma-ray emitting radionuclides. The LABS 800 may also be used to measure larger area water or air regions that may be contaminated with these radionuclides. In other words, the LABS 800 may be a large area specialized multi-layer detector and analysis system for use in scanning large areas to relatively rapidly quantify the distribution of radionuclides that are difficult to detect using conventional methods. The LABS 800 may be particularly useful in field environments, such as those that might be around nuclear reactors, nuclear waste processing sites, or medical facilities.

The first and second scintillators 810, 820 may be mounted on a metal structural assembly to provide structural support for the LABS 800. For example, the LABS 800 may be mounted on a vehicle to drive over an area and collect the radionuclide data. A technician may also walk the LABS 800 around the area. The materials used, as well as the structure of the LABS 800, enables the LABS 800 to be relatively lightweight compared with conventional detectors that require heavy shielding materials for discrimination. The light weight may also provide easier transport of the LABS 800, as well as reduced costs. The structure of the LABS 800 further enables detection and discrimination of lower energy radionuclides that may not be individually detected by conventional methods. In addition, a real-time response may be monitored in a variety of different media (e.g., air, water, soil). For example, demonstrated detection limits for some radionuclides have been as low as 1 pCi/g with measurement times of less than one minute.

The LABS 800 may be further associated with positioning equipment (e.g., a global positioning system (GPS)) that associates the collected data with a particular location, which may be used to recreate a map of the area to show where the particular radionuclides were detected. In some embodiments, the LABS 800 may be mounted at a specific location, such as in a stream, at a critical checkpoint for weapons detection, etc.) to continuously monitor that location for changes in radionuclide movement across that location. In another embodiment, the LABS 800 may be mounted to a remote controlled device (e.g., vehicle, robotic arm, etc.) that may permit radionuclide detection in locations where it is not desired or possible for a technician to be present. In addition to these in situ and field applications, the LABS 800 may be used in a laboratory environment.

Figure 9:
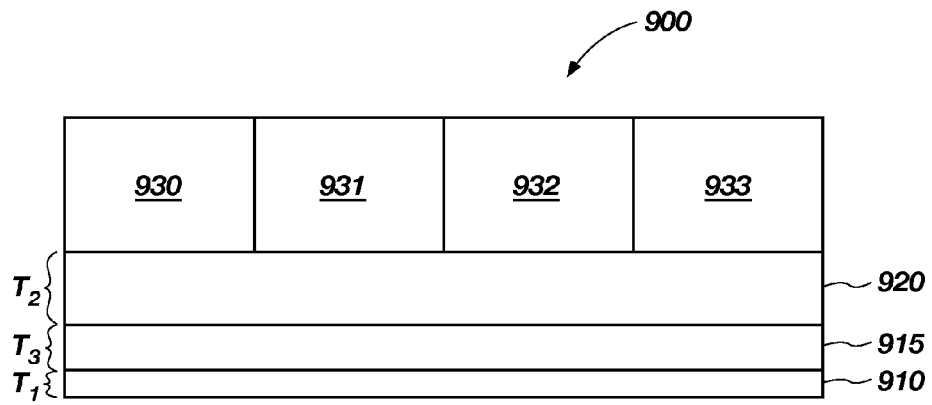
FIG. 9 is a schematic diagram of a large area radiation detector system according to another embodiment of the present disclosure.

FIG. 9 is a schematic diagram of a large area radiation detector system (LABS) 900 according to another embodiment of the present disclosure. The LABS 900 may include a first scintillator 910, a second scintillator 915, a third scintillator 920, and a plurality of light-to-electrical converters 930, 931, 932, 933. Having another scintillator (three shown in this embodiment) enables the LABS 900 to further discriminate among a plurality of different radionuclides. For example, the first scintillator 910 may be structured for full energy deposition of a first low-energy beta emitter (e.g., H-3), the second scintillator 915 may be structured for full energy deposition of a second low-energy beta emitter (e.g., TC-99) (the second low-energy beta emitter has a higher energy than the first low-energy beta emitter) and the third scintillator 920 may be structured for full energy deposition of a higher energy radiation emitter (e.g., SR-90). Additional embodiments may include more scintillators structured for further discrimination of additional radionuclides. As a result, the LABS 900 may be tuned to detect and discriminate between a variety of radionuclides, including alpha emitters, beta emitters, gamma emitters, and combinations thereof.

Figure 10:
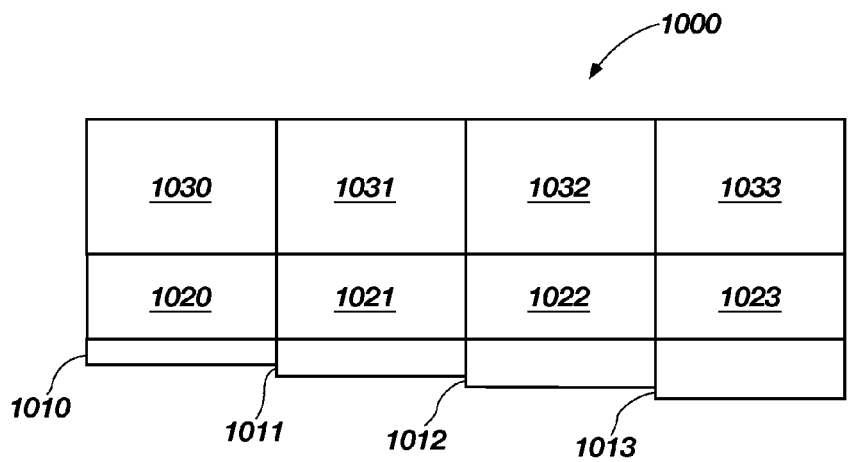
FIG. 10 is a schematic diagram of a large area radiation detector system according to another embodiment of the present disclosure.

FIG. 10 is a schematic diagram of a large area radiation detector system 1000 according to another embodiment of the present disclosure. The LABS 1000 may include a plurality of first scintillators 1010, 1011, 1012, 1013, a plurality of second scintillators 1020, 1021, 1022, 1023, and a plurality of light-to-electrical converters 1030, 1031, 1032, 1033. While the plurality of light-to-electrical converters of FIGS. 8 and 9 are shown to receive light from continuous sections of scintillators, the plurality of light-to-electrical converters 1030, 1031, 1032, 1033 may correspond to discrete sections of an array of scintillators that combine to form the LABS 1000. For example, a first light-to-electrical converter 1030 may correspond to the first scintillator 1010 and the second scintillator 1020 to receive light therefrom. A second light-to-electrical converter 1031 may correspond to the first scintillator 1011 and the second scintillator 1021 to receive light therefrom. A third light-to-electrical converter 1032 may correspond to the first scintillator 1012 and the second scintillator 1022 to receive light therefrom. A fourth light-to-electrical converter 1033 may correspond to the first scintillator 1013 and the second scintillator 1023 to receive light therefrom. Each individual scintillator may have a different thickness, material composition, or both, for discrimination of different radionuclides. For example, each of the plurality of first scintillators 1010, 1011, 1012, 1013 may have different thicknesses for full energy deposition of emissions from a different radionuclide. Although not specifically shown, it is contemplated that the thickness, material composition, or both may be different for one or more of the plurality of second scintillators 1020, 1021, 1022, 1023.

As a result, the LABS 1000 may discriminate between a larger number of different radionuclides using vertical division having different thicknesses rather than the additional horizontal sheets of scintillators (as in FIG. 9). Of course, it is contemplated that additional scintillators may be present (e.g., each column of the array may include three or more scintillators of various thicknesses). The data analysis modules, such as data acquisition hardware (FIG. 4) and software modules (FIG. 4) may receive each data set individually from each of the plurality of light-to-electrical converters 1030, 1031, 1032, 1033, and may perform a combined analysis for measuring deviations from the background, discriminating the different radionuclides, mapping the data, etc.

CONCLUSION

An embodiment of the present disclosure includes an apparatus for detecting a radiation source. The apparatus comprises a first scintillator and a second scintillator adjacent to the first scintillator. Each of the first scintillator and second scintillator may be structured to generate a light pulse responsive to interacting with incident radiation. The first scintillator may be structured to experience full energy deposition of a first low-energy radiation, and permit a second higher-energy radiation to pass therethrough and interact with the second scintillator. The apparatus further comprises a plurality of light-to-electrical converters operably coupled to the second scintillator and configured to convert light pulses generated by the first scintillator and the second scintillator into electrical signals. The first scintillator and the second scintillator exhibit at least one mutually different characteristic for an electronic system to determine whether a given light pulse is generated by the first scintillator or the second scintillator.

Another embodiment of the present disclosure includes an apparatus for detecting a radiation source. The apparatus comprises a first detector and an adjacent, second detector, each structured to generate a light pulse responsive to interacting with incident radiation. The first detector may be structured to experience full energy deposition of a low-energy radiation emission from a particular radionuclide and permit a second higher-energy radiation emission to pass therethrough and experience full energy deposition within the second detector. The apparatus further comprises a plurality of light-to-electrical converters operably coupled to the second scintillator for converting the light pulses generated by the first detector and the second detector into electrical signals.

Yet another embodiment of the present disclosure includes a method for detecting a selected radioactive activity in an environment. The method comprises detecting a first set of low-energy radiation pulses within a first scintillator through a plurality of light-to-electrical converters, detecting a second set of higher-energy radiation pulses within a second scintillator through the light-to-electrical converters, wherein a detection surface area of the first and second scintillators is greater than a surface area of an individual light-to-electrical converter, and subtracting a portion of the first set of low-energy beta particle radiation pulses related to an estimated contribution of pulses generated in the first scintillator by the second set of higher-energy radiation pulses generated within the second scintillator.

While embodiments of the present disclosure are susceptible to various modifications and implementation in alternative forms, specific embodiments have been shown by way of non-limiting example in the drawings and have been described in detail herein. However, it should be understood that the disclosure is not intended to be limited to the particular forms disclosed. Rather, the invention includes all modifications, equivalents, and alternatives falling within the scope of the following appended claims and their legal equivalents.

What is claimed is:

1. An apparatus for detecting a radiation source, the apparatus comprising:
a first scintillator divided into discrete sections, wherein at least two of the discrete sections are structured with a different thickness;
a second scintillator adjacent to the first scintillator;
each of the first scintillator and second scintillator being structured to generate a light pulse responsive to interacting with incident radiation, the first scintillator being structured to experience full energy deposition of a first low-energy radiation, and permit a second higher-energy radiation to pass therethrough and interact with the second scintillator; and
a plurality of light-to-electrical converters operably coupled to the second scintillator and configured to convert light pulses generated by the first scintillator and the second scintillator into electrical signals, wherein the first scintillator and the second scintillator exhibit at least one mutually different characteristic for an electronic system to determine whether a given light pulse is generated by the first scintillator or the second scintillator.

2. The apparatus of claim 1, wherein the at least one mutually different characteristic includes a different pulse shape of light pulses generated by the first scintillator and the second scintillator.

3. The apparatus of claim 1, wherein at least one of the first scintillator and the second scintillator includes a plastic scintillator element.

4. The apparatus of claim 1, wherein the electronic system is configured to receive the light pulses and discriminate between a plurality of different radionuclides that emitted the incident radiation.

5. The apparatus of claim 4, wherein the plurality of different radionuclides includes at least two radionuclides selected from the group consisting of Tc-99, H-3, Sr-90, Y-90, Cs-137, Co-60, Th-232, K-40, U-235, U-238, C-14, I-129, Ni-63, and Am-241.

6. The apparatus of claim 1, wherein the first low-energy radiation and the second higher-energy radiation is of a same radiation type.

7. The apparatus of claim 6, wherein the same radiation type includes beta particles.

8. The apparatus of claim 1, wherein each of the first scintillator and the second scintillator are continuous layers shared by the plurality of light-to-electrical converters.

9. The apparatus of claim 1, further comprising a guard element adjacent to the first scintillator, wherein the guard element is configured to protect a surface of the first scintillator.

10. The apparatus of claim 9, wherein the guard element is further configured to prevent entry of alpha particles into the first scintillator.

11. The apparatus of claim 1, wherein the second scintillator is structured to experience full energy deposition of the second higher-energy radiation.

12. An apparatus for detecting a radiation source, the apparatus comprising:
a first scintillator and an adjacent, second scintillator, each structured to generate a light pulse responsive to interacting with incident radiation, wherein the first scintillator is structured to experience full energy deposition of beta particles from a first particular radionuclide of interest and permit a second higher-energy radiation emission to pass therethrough and experience full energy deposition within the second scintillator; and
a plurality of light-to-electrical converters operably coupled to the second scintillator for converting the light pulses generated by the first scintillator and the second scintillator into electrical signals.

13. The apparatus of claim 12, further comprising a third scintillator adjacent to the second scintillator, wherein the third scintillator is structured to generate a light pulse responsive to interaction with incident radiation, wherein the third scintillator is structured to experience full energy deposition of a third higher-energy radiation emission after passing through the first scintillator and the second scintillator.

14. The apparatus of claim 12, wherein the second scintillator is structured to experience full energy deposition of beta particles from a second particular radionuclide of interest.

15. The apparatus of claim 12, further comprising:
   data acquisition hardware configured to determine whether a given light pulse is generated in the first scintillator or in the second scintillator based on a mutually different characteristic exhibited by the first scintillator and the second scintillator; and
   at least one software module configured to separate out counts from the first low-energy radiation emission from counts attributable to the second higher-energy radiation emission in the first scintillator.

16. The apparatus of claim 15, wherein the mutually different characteristic includes a rise time for the light pulses generated in the first scintillator and the second scintillator.

17. The apparatus of claim 15, wherein the at least one software module is configured to discriminate between radiation emissions from a plurality of different radionuclides that emit a same radiation type.

18. The apparatus of claim 17, wherein the at least one software module is configured to discriminate between radiation emissions from a plurality of different radionuclides that emit a different radiation type.

19. The apparatus of claim 15, further comprising a mounting structure having the first scintillator, the second scintillator, and the plurality of light-to-electrical converters mounted thereon.

20. The apparatus of claim 19, wherein the mounting structure is configured to scan the first scintillator and the second scintillator over an environment.

21. The apparatus of claim 19, wherein the mounting structure is at a fixed location.

22. The apparatus of claim 19, further comprising a global positioning system operably coupled with the data acquisition hardware for providing locational information associated with the light pulses generated from the incident radiation.

23. The apparatus of claim 22, wherein the at least one software module is further configured to create a map of an environment by locating positions where incident radiation was detected with an identification of particular radionuclides discriminated by the at least one software module.

24. The apparatus of claim 12, wherein the first scintillator and the second scintillator are divided up into vertical columns corresponding to individual light-to-electrical converters of the plurality of light-to-electrical converters.

25. The apparatus of claim 24, wherein at least two of the vertical columns differ in at least one of a thickness and a material composition for the first scintillator.

26. A method for detecting a selected radioactive activity in an environment, the method comprising:
   detecting a first set of low-energy radiation pulses within a first scintillator through a plurality of light-to-electrical converters;
   detecting a second set of higher-energy radiation pulses within a second scintillator through the light-to-electrical converters, wherein a detection surface area of the first and second scintillators is greater than a surface area of an individual light-to-electrical converter; and
   subtracting a portion of the first set of low-energy beta particle radiation pulses related to an estimated contribution of pulses generated in the first scintillator by the second set of higher-energy radiation pulses generated within the second scintillator.

27. The method of claim 26, wherein detecting the first set of low-energy radiation pulses includes obtaining pulses from a full energy deposition in the first scintillator for a particular low-energy beta particle emitter of interest.

28. The method of claim 27, wherein detecting the second set of higher-energy radiation pulses includes obtaining pulses from a full energy deposition in the second scintillator for a specific higher-energy beta particle emitter.

* * * * *

UNITED STATES PATENT AND TRADEMARK OFFICE
CERTIFICATE OF CORRECTION

PATENT NO. : 9,018,586 B2  Page 1 of 1
APPLICATION NO. : 13/534829
DATED : April 28, 2015
INVENTOR(S) : Douglas W. Akers and Mark W. Drigert It is certified that error appears in the above-identified patent and that said Letters Patent is hereby corrected as shown below:

In the specification:
COLUMN 10, LINE 21, change "photo-diode," to --photodiode,--

Signed and Sealed this
Twentieth Day of October, 2015

Michelle K. Lee
*Director of the United States Patent and Trademark Office*